(12) United States Patent
Lador et al.

(10) Patent No.: US 11,544,555 B1
(45) Date of Patent: Jan. 3, 2023

(54) INVOICE DATA CLASSIFICATION AND CLUSTERING

(71) Applicant: Intuit Inc., Mountain View, CA (US)

(72) Inventors: Shir Meir Lador, Hod Hasharon (IL); Sigalit Bechler, Hod Hasharon (IL); Elik Sror, Hod HaSharon (IL); Shlomi Medalion, Hod Hasharon (IL); Onn Bar, Hod HaSharon (IL); Erez Katzenelson, Hod HaSharon (IL); Alexander Zhicharevich, Hod Hasharon (IL); Ariel Simhon, Hod HaSharon (IL); Gal Keinan, Hod HaSharon (IL)

(73) Assignee: Intuit Inc., Mountain View, CA (US)

( * ) Notice: Subject to any disclaimer, the term of this patent is extended or adjusted under 35 U.S.C. 154(b) by 759 days.

(21) Appl. No.: 16/526,767

(22) Filed: Jul. 30, 2019

(51) Int. Cl.
  *G06G 7/00* (2006.01)
  *G06N 3/08* (2006.01)
  *G06K 9/62* (2022.01)
  *G06N 20/00* (2019.01)
  *G06F 17/16* (2006.01)

(52) U.S. Cl.
  CPC .............. *G06N 3/08* (2013.01); *G06F 17/16* (2013.01); *G06K 9/6218* (2013.01); *G06N 20/00* (2019.01)

(58) Field of Classification Search
  CPC .......... G06N 3/08; G06N 20/00; G06F 17/16; G06K 9/6218
  USPC ................................ 706/15, 12, 13; 705/330
  See application file for complete search history.

(56) References Cited

U.S. PATENT DOCUMENTS

| | | | |
|---|---|---|---|
| 10,425,353 B1* | 9/2019 | Vadera | G06N 20/00 |
| 2008/0147574 A1* | 6/2008 | Chidlovskii | G06F 16/35 706/12 |
| 2010/0306141 A1* | 12/2010 | Chidlovskii | G06N 20/00 706/13 |
| 2014/0351160 A1* | 11/2014 | Felse | G07B 17/00467 705/330 |
| 2019/0048306 A1* | 2/2019 | Brown | G06N 7/005 |
| 2019/0156123 A1* | 5/2019 | Chiang | G06V 10/50 |
| 2019/0156125 A1* | 5/2019 | Massoudifar | G06N 3/0454 |
| 2020/0005333 A1* | 1/2020 | Lutich | G06Q 30/04 |
| 2020/0073882 A1* | 3/2020 | Guggilla | G06N 5/022 |
| 2020/0175559 A1* | 6/2020 | Saito | G06F 16/2456 |
| 2020/0233857 A1* | 7/2020 | Fehling | G06Q 10/10 |
| 2020/0342012 A1* | 10/2020 | Weiss | G06N 20/10 |
| 2020/0342014 A1* | 10/2020 | Kumar | G06F 16/3334 |
| 2020/0356823 A1* | 11/2020 | Neufeld | G06N 3/08 |
| 2020/0356824 A1* | 11/2020 | Neufeld | G06K 9/6256 |
| 2021/0012102 A1* | 1/2021 | Cristescu | G06F 40/284 |
| 2021/0279081 A1* | 9/2021 | Curic | G06F 16/35 |
| 2022/0100994 A1* | 3/2022 | Schäfer | G06V 30/416 |
| 2022/0157071 A1* | 5/2022 | Rawat | G06V 10/30 |

* cited by examiner

*Primary Examiner* — Thuy N Pardo
(74) *Attorney, Agent, or Firm* — Ferguson Braswell Fraser Kubasta PC

(57) ABSTRACT

Methods and systems classify and cluster invoice data. An invoice is obtained. A category vector is generated from an invoice string of the invoice with a dense layer of a machine learning model that includes an embedding layer, a neural network layer, and the dense layer. A suggestion is selected with a selection engine and in response to comparing the category vector to a set of clusters. The suggestion is presented.

20 Claims, 6 Drawing Sheets

INVOICE DATA CLASSIFICATION AND CLUSTERING

BACKGROUND

When a product, such as a good and/or a service, is sold by a buyer to a seller, an invoice may be created. An invoice is a commercial instrument that memorializes the various invoice terms of the transaction including product information and payment terms. The invoice terms identify the goods and services (i.e., the products) provided by one party to the other, an amount to exchange for the goods and services, and a due date. Computer technology is used for invoices to create invoices and communicate the invoices between the buyers and the sellers. Repositories that store invoices may include thousands to millions of records. It is a challenge to identify the relationships and corresponding suggestions from invoices for new products that a business may offer.

SUMMARY

In general, in one aspect, one or more embodiments relate to a method for invoice data classification and clustering. An invoice is obtained. A category vector is generated from an invoice string of the invoice with a dense layer of a machine learning model that includes an embedding layer, a neural network layer, and the dense layer. A suggestion is selected with a selection engine and in response to comparing the category vector to a set of clusters. The suggestion is presented and is different from an invoice product described by the invoice.

In general, in one aspect, one or more embodiments relate to a system for invoice data classification and clustering. The system includes a processor and a memory coupled to the processor. The memory comprises an application that executes on the processor and uses the memory. An invoice is obtained. A category vector is generated from an invoice string of the invoice with a dense layer of a machine learning model that includes an embedding layer, a neural network layer, and the dense layer. A suggestion is selected with a selection engine and in response to comparing the category vector to a set of clusters. The suggestion is presented and is different from an invoice product described by the invoice.

In general, in one aspect, one or more embodiments relate to a training system for invoice data classification and clustering. The system includes a processor and a memory coupled to the processor. The memory comprises an application that executes on the processor and uses the memory. A set of training invoices is obtained. A neural network layer and a dense layer of a machine learning model are trained using a training application and the set of training invoices. The machine learning model includes an embedding layer, the neural network layer, the dense layer, and an activation layer. A set of category vectors is generated from the set of training invoices using the dense layer. A set of clusters of a cluster model is trained with a cluster engine using the set of category vectors.

Other aspects of the invention will be apparent from the following description and the appended claims.

DETAILED DESCRIPTION

Figure 1:
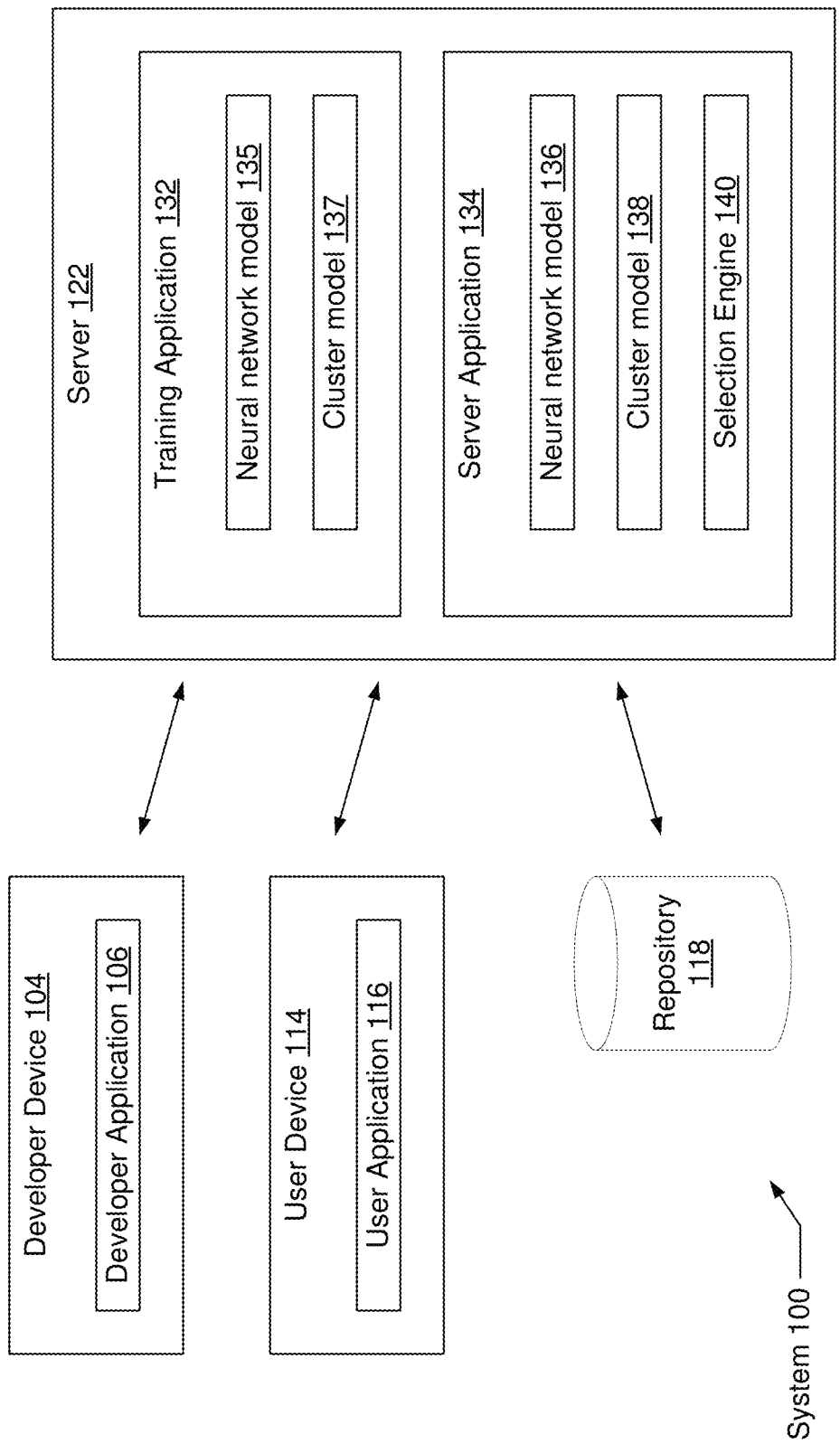
FIG. 1 shows a diagram of systems in accordance with disclosed embodiments.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments are directed to a computer system performing machine learning to leverage information from invoices in order to provide accurate suggestions to a business on additional products and/or services to offer. Thus, embodiments allow a user to receive suggestions for additional products that can be offered by a business. The user receives the suggestion from a user interface and/or a web application. The suggestions are based on invoices from the business of the user, which are analyzed with a neural network model and a cluster model. The neural network model and cluster model are trained from the invoices of other businesses. The neural network model is trained to identify a business category from an invoice. A business category is an identification of a business that is relates to the type of business and the type of products offered by the business. After training the neural network model, the cluster model is trained using the output from the neural network model. After training the neural network model and the cluster model, the user identifies invoices to analyze. The invoices are input to the neural network model, which generates outputs that are compared with the cluster model to generate the suggestions for products that the business may offer.

In the present application, an invoice is a commercial instrument issued by a sender (e.g., seller) to a recipient (e.g., buyer) for a product transaction (i.e., a sell of products for value) to request future payment. A product is a good and/or a service. The value is typically a monetary value. The invoice may identify the seller, the buyer, and any other party along with a listing of products. The listing may include a description, quantity, and price of each product. Additional terms may be included, such as shipment information, discounts (if any), delivery terms, and payment terms.

In the present application, the use of the term neural network, complies with the use in the art. A neural network is a network of artificial neurons that solves artificial intelligence (AI) problems. The connections between the artificial neurons of the neural network are modeled as weights. A positive weight reflects an excitatory connection, while negative values mean inhibitory connections. Inputs are modified by a weight and summed, which may be referred to as a linear combination. An activation function may be used to control the amplitude of the output. For example, an acceptable range of output may be real values between 0 and 1, or between −1 and 1 when an activation function is used. Without the activation function, the outputs may be between negative infinity and positive infinity.

In the present application, various vectors are used for which a brief overview is provided here. Additional description may be found further below. A word vector is a vector that represents the meaning of a word by the real number values in the dimensions of a multidimensional vector. For example, a word vector may have 3000 dimensions where individual dimensions are associated with certain meanings and have a real values. The larger the value of a dimension, the higher the likelihood that the word represented by the word vector has the meaning associated with the dimension. For example the words "king" and "queen" may both have high values for a royalty dimension and have opposite values for gender dimensions.

In the present application, an intermediate vector may be a vector generated from a word vector and then be used to generate a category vector. Intermediate vectors may have any number of dimensions, including having the same number of dimensions as the word vectors.

In the present application, a category vector is a vector that identifies a business category. The category of a business is related to the type and products of a business, which are represented by the different dimensions of a category vector. The category vector is generated from the intermediate vector and subsequently from the word vector. As such, the category vector is indirectly determined from the meaning of words rather than directly from words themselves.

In the present application, an activated vector is a vector generated from a category vector by applying an activation function to the category vector. The activation function may squash the values of the input category vector to be in a defined range. The activated vector may have the same number of dimensions with the same meanings as the category vector.

FIG. 1 shows a diagram of system in accordance with the disclosure. The various elements, systems, and components shown in FIG. 1 may be omitted, repeated, combined, and/or altered as shown from FIG. 1. Accordingly, the scope of the present disclosure should not be considered limited to the specific arrangements shown in FIG. 1.

The system (100) classifies and clusters invoices to provide recommendations. The invoices may be stored in electronic form in the repository (118) and include invoice information with values that identify the parties to the transaction, a value for the amount of the invoice, values for dates of the invoice (created, sent, paid), an invoice string, etc. In one or more embodiments, the invoice string includes a text description of the product (i.e., goods and services) of a business.

The recommendations generated by the system (100) identify additional products that a business may provide. The recommendations are generated by comparing invoices from the business with invoices from other businesses using the neural network model (136) and the cluster model (138).

Figure 6A:
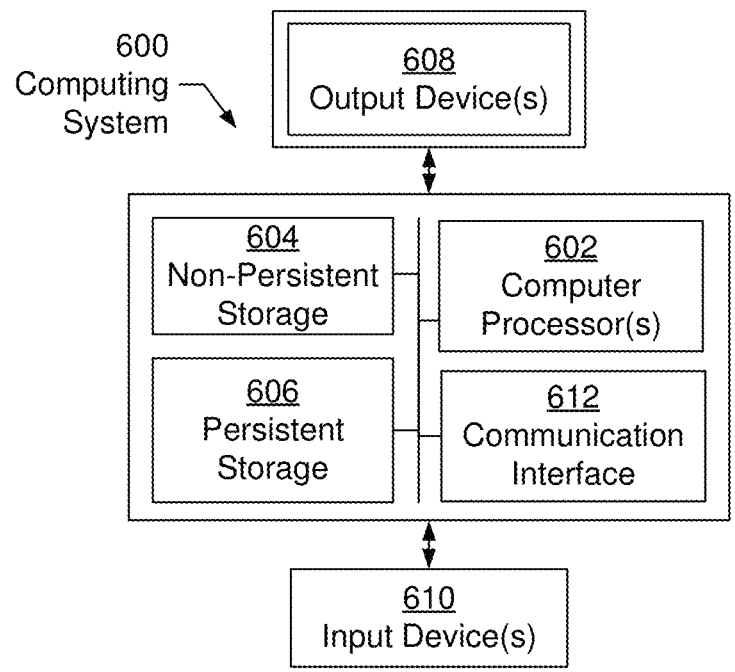
FIG. 6A and FIG. 6B show computing systems in accordance with disclosed embodiments.
Figure 6B:
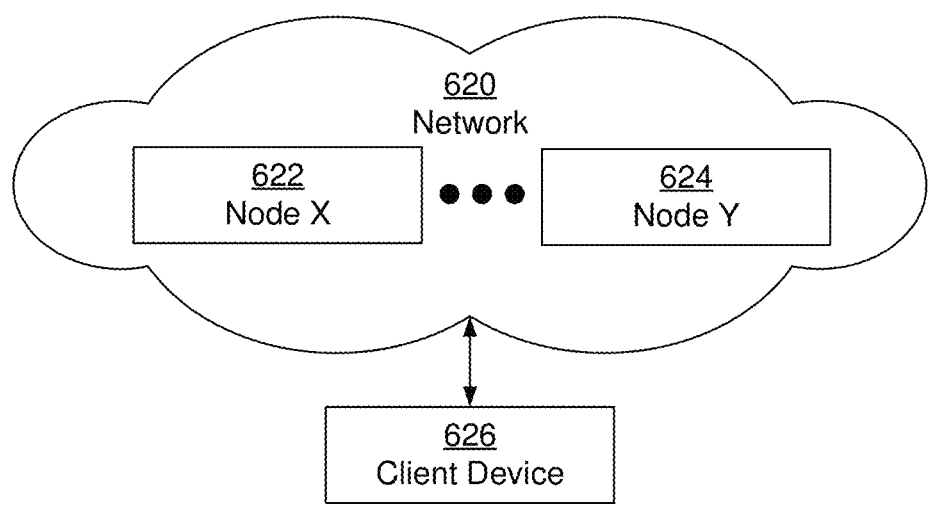

Turning to the server, the server (122) is an embodiment of the computing system (600) and the nodes (622) and (624) of FIG. 6A and FIG. 6B. The server (122) includes the training application (132) and the server application (134). The server (122) is operated by an invoice services provider to provide suggestions to businesses using the server application (134) and the training application (132).

The server application (134) is a set of programs on the server (122) that receives invoices, performs inferences on the invoice information with machine learning models, and provides suggestions based on the outputs of the machine learning models. In one or more embodiments, the server application (134) includes the neural network model (136), the cluster model (138), and the selection engine (140).

Figure 4:
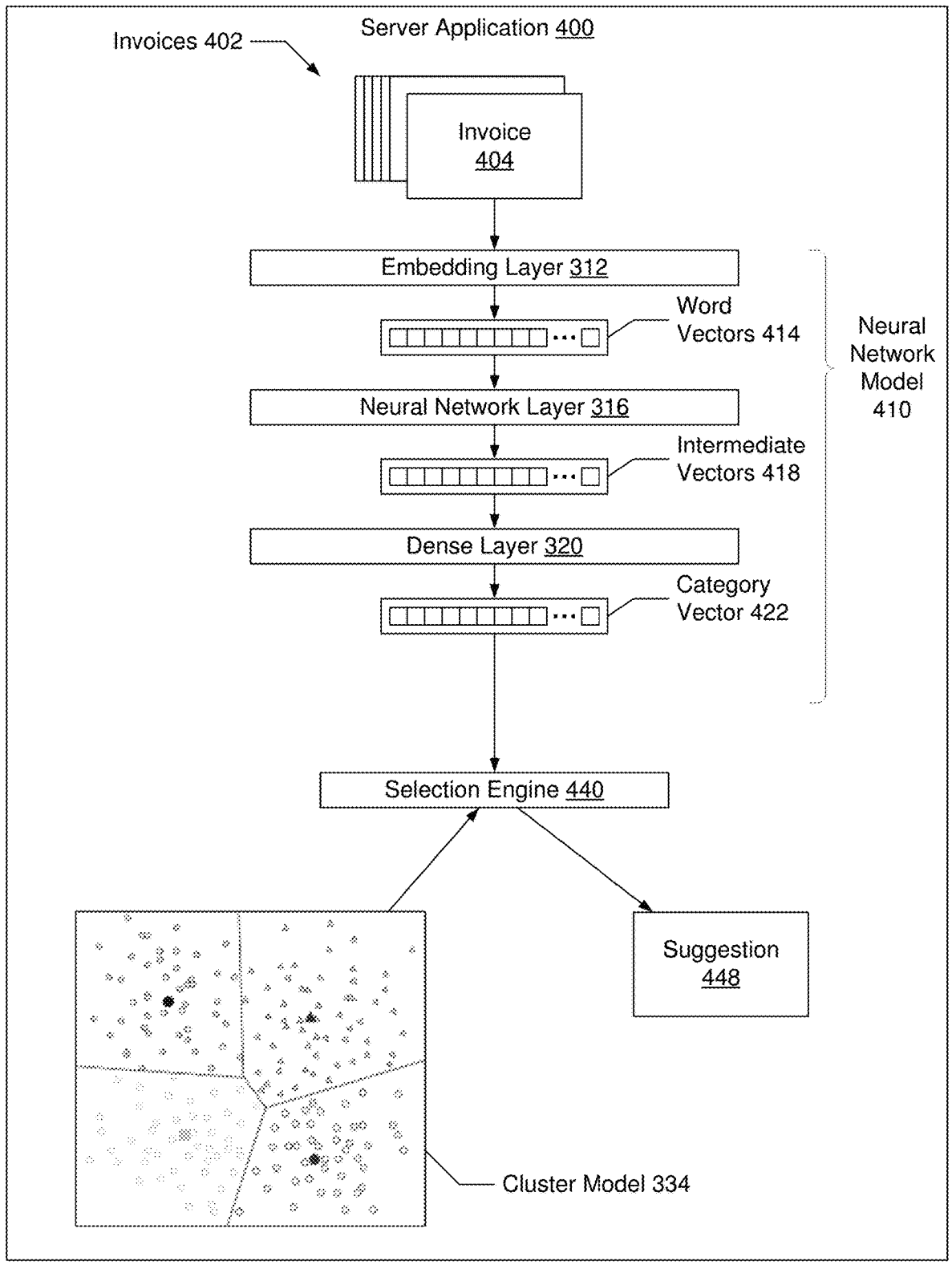

The neural network model (136) is a set of programs on the server (122) that implement a neural network for providing suggestions for invoices. The neural network model (136) receives the invoice string from an invoice as an input and generates an output, which the selection engine (140) uses with the cluster model (138) to generate one or more recommendations. The neural network model (136) includes multiple layers from the neural network model (135) that was trained with the training application (132). The layers of the neural network model (136) may include an embedding layer that generates word vectors from invoice strings, a neural network layer that generates intermediate vectors from the word vectors, and a dense layer that generates category vectors from the intermediate vectors. An example of the neural network model (136) is shown in FIG. 4.

The neural network model (136) may learn features of the invoices from invoice strings and then determines a business category identified with a category vector from those features. An advantage with the neural network model (136) is that the features and business categories may or may not be similar to the original words of the invoice. Thus, the category determined from an invoice for a business may be different than the words used in the invoice and have more accurate identification of related businesses. Additionally, different categories of businesses may have similar items on their invoices. For example, a furniture company, a delivery service, and large appliance company may have invoices with invoice strings that describe delivering goods to a location. The neural network (136) with the cluster model (138) may group each of these different businesses into the same cluster based on the similarities between the category vectors generated from the invoice strings of the invoices of the businesses.

The cluster model (138) is a set of programs on the server (122). The cluster model (138) comprises a threshold number of clusters that the selection engine (140) uses to organize the category vectors generated by the neural network model (136). A cluster is a grouping of category vectors and may be defined by the centroid of the category vectors within the cluster. In one or more embodiments, the centroid of a cluster is determined by taking the average of the elements (e.g., the category vectors) assigned to the cluster. The cluster model (138) is generated from the cluster model (137) and may be updated from the cluster model (137) by the inclusion of additional category vectors that were generated after the cluster model (137) was trained by the training application (132).

The selection engine (140) is a set of programs on the server (122) that selects suggestions based on the outputs from the neural network model (136) using the cluster model (138). In one or more embodiments, the selection engine (140) compares category vectors from the neural network model (136) against the cluster model (138) to generate the suggestions, which is further discussed in FIG. 2B.

Continuing with FIG. 1, the training application (132) is a set of programs on the server (122) that trains the machine learning models (e.g., the neural network model (135) and the cluster model (137)) (described below) that form the basis of the machine learning models (e.g., the neural network model (136) and the cluster model (138)) (described below) used by the server application (134). The machine learning models may be trained with invoices from the repository (118) that may be selected and edited by the user with the user device (114).

Figure 3:
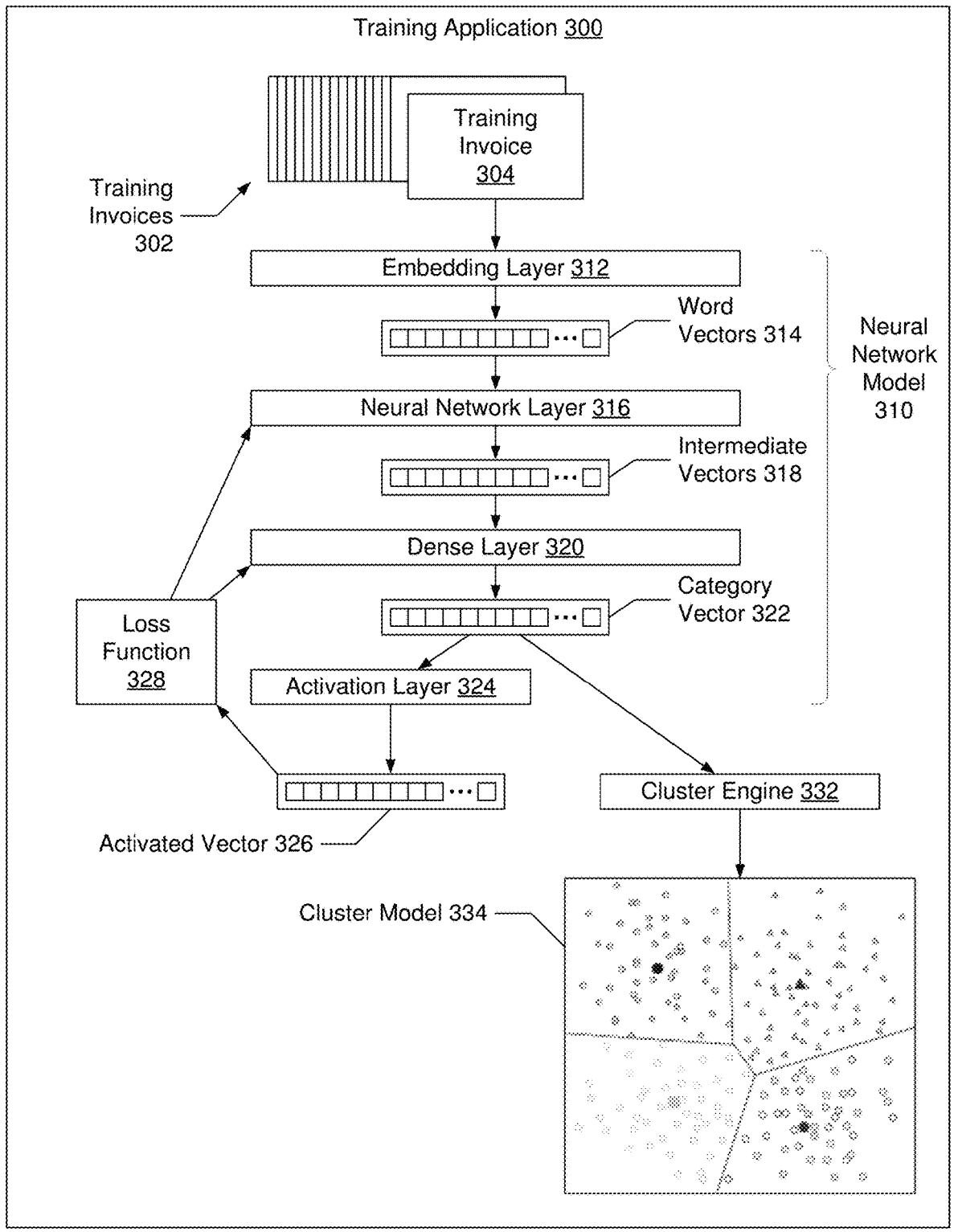
FIG. 3, FIG. 4, and FIG. 5 show examples in accordance with disclosed embodiments.

The neural network model (135) is a set of programs on the server (122) that is the basis for the neural network model (136). In other words, neural network model (136) is a trained version of neural network model (135). The neural network model (135) is trained by the training application (130) with multiple invoices from the repository (118). In one or more embodiment, the neural network model (135) includes an activation layer (which may not be included in the neural network model 136) that generates activated vectors from the category vectors. The activation layer may be in addition to an embedding layer, a neural network layer and a dense layer. An example of the neural network model (135) is shown in FIG. 3.

The cluster model (137) is a set of programs on the server (122) that is the basis for the cluster model (138). The cluster model (137) is trained on category vectors generated with the neural network model (135) after the neural network model (135) has been trained. The clusters of the cluster model (137) may be trained with the k-means clustering algorithm. K-means clustering is a method of vector quantization. K-means clustering partitions multiple observations (e.g., category vectors) into a threshold number of clusters in which each observation belongs to the cluster with the nearest mean (i.e., centroid), which serves as the prototype of the cluster. In at least some embodiments, the threshold number is a defined number of clusters.

The developer device (104) is an embodiment of the computing system (600) and the nodes (622) and (624) of FIG. 6A and FIG. 6B. The developer device (104) includes the developer application (106) for accessing the training application (132). The developer application (106) may include a graphical user interface for interacting with the training application (132) to train the machine learning models of the system (100). In one or more embodiments, the developer application (106) is part of a development environment that controls the development, training, and deployment of the server application (134) using the training application (132).

The user device (114) is an embodiment of the computing system (600) and the nodes (622) and (624) of FIG. 6A and FIG. 6B. The user device (114) includes the user application (120) for accessing the server application (134). The user application (120) may include a graphical user interface for interacting with the server application (132) to select invoices and display suggestions.

The developer application (106) and the user application (116) may be web browsers that access the training application (132) and the server application (134) using web pages hosted by the server (122). In additional embodiments, the developer application (106) and the user application (116) may be web services that communicate with the training application (132) and the server application (134) using a representational state transfer application programming interface (RESTful API).

Figure 2A:
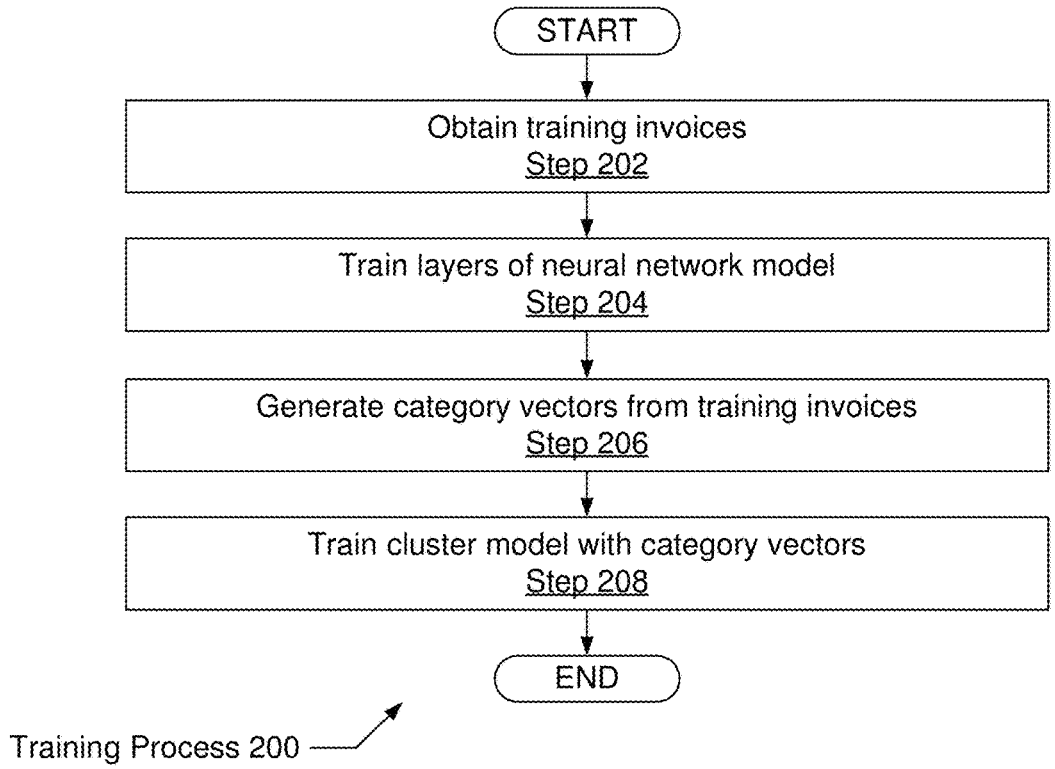
FIG. 2A and FIG. 2B show flowcharts in accordance with disclosed embodiments.
Figure 2B:
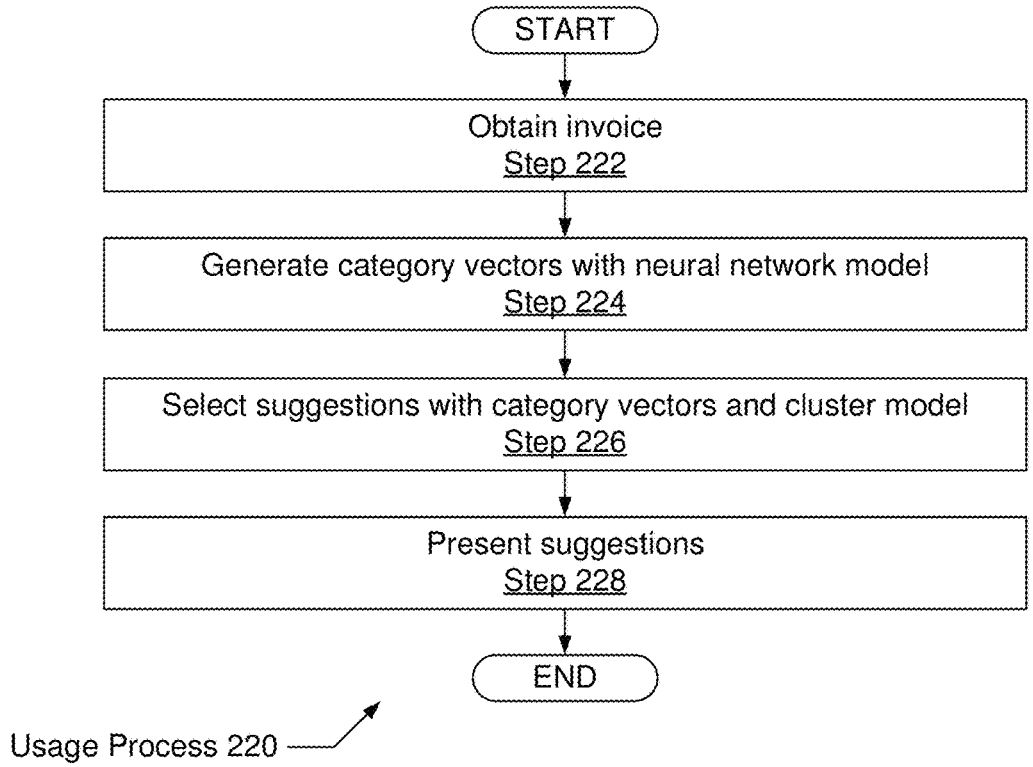

FIG. 2A and FIG. 2B show a flowcharts of the process (200) and the process (220) in accordance with one or more embodiments of the disclosure for generating invoice recommendations. While the various steps in the flowcharts are presented and described sequentially, one of ordinary skill will appreciate that at least some of the steps may be executed in different orders, may be combined or omitted, and at least some of the steps may be executed in parallel. Furthermore, the steps may be performed actively or passively. For example, some steps may be performed using polling or be interrupt driven in accordance with one or more embodiments. By way of an example, determination steps may not have a processor process an instruction unless an interrupt is received to signify that condition exists in accordance with one or more embodiments. As another example, determinations may be performed by performing a test, such as checking a data value to test whether the value is consistent with the tested condition in accordance with one or more embodiments.

Turning to FIG. 2A, the process (200) trains the machine learning model used for generating suggestions from invoices. In one or more embodiments, the machine learning model may include a neural network model and a cluster model.

In Step 202, training invoices are obtained. In one or more embodiments, the training invoices include historical invoices that multiple businesses from multiple business categories have sent to customers relating to multiple products and multiple industries. The training invoices include invoice information with invoice strings. In one or more embodiments, an invoice string is a string of characters that may identify the product exchanged in the transaction documented with the invoice.

In Step 204, the layers of the neural network model are trained. In one or more embodiments, the neural network model includes an embedding layer, a neural network layer, a dense layer, and an activation layer. In one or more embodiments, the neural network model is trained to predict the category (i.e., the business category) of the business that created an invoice that is input to the neural network model. The neural network model is trained by inputting a training invoice to the neural network model to generate an output, comparing the output with expected results, and updating the weights of the neural network model based upon the comparison of the output with the expected results. An example of the neural network being trained is shown in FIG. 3.

The embedding layer of the neural network may include multiple layers and operations. For example, the embedding layer may convert an invoice string from a training invoice to a vector of integers. The embedding layer may then convert the vector of integers to a set of word vectors. The word vectors may have a number of dimensions that is greater than the number of different words from the corpus of training invoices.

In one or more embodiments, the invoice string from a training invoice is converted to a vector of integers by truncating the description to a threshold number of words (e.g., the first eight words of the description) and converting the words from the invoice string to a vector of integer elements. The values of the integer elements are numbers that are assigned to the unique words or word stems found in the corpus of training invoices.

In one or more embodiments, the vector of integers are converted to the set of word vectors using a two layer neural network. As an example, the vector of eight integers generated from the invoice string of the invoice is input to the two layer neural network, that outputs a set of eight word vectors. In one or more embodiments, the two layer neural network in the embedding layer is pre-trained and the embedding layer is not updated with the rest of the neural network model.

After generating the word vectors, the neural network layer generates a set of intermediate vectors from the word vectors. The neural network layer may include multiple neural networks and architectures, including long short term memories (LSTMs) and convolutional neural networks (CNNs). The output from the neural network layer may have the same dimensions as the input to the neural network layer and may include additional channels.

After generating the intermediate vectors, the dense layer generates a category vector from the output of the neural network layer. The dense layer may be a fully connected neural network with multiple sub layers where each input is connected to each output. The output from the dense layer may be a single vector with a number of dimensions equal to the number categories of businesses for the training invoices, which may be different from the number of dimensions of the intermediate vectors.

After generating the category vector, the activation layer generates an activated vector from the category vector. The activation layer may use an activation function to squash the values from the category vector and form the activated vector. As an example, using a sigmoid activation function may squash the values of the category vector from being real values between negative infinity and positive infinity to being real values between 0 and 1. Other activation functions with different ranges and properties may be used.

After generating the activated vector, a loss function compares the category identified with the activated vector to the category that has been previously assigned to the training invoice. Backpropagation is used to update the weights in the dense layer and the neural network layer based on the error identified between the category identified with the activated vector and the category assigned to the training invoice. In one or more embodiments, the activation layer and the embedding layer may not be updated by the loss function.

In Step 206, category vectors are generated from training invoices. In one or more embodiments, a set of training invoices (which may be the same as the training invoices used to for training the machine learning model and referred to as a training set of category vectors) are input to the machine learning model to generate an output set of category vectors. In one or more embodiments, the category vectors are generated from training invoices that were received after training the machine learning model and were not used for training the machine learning model.

In Step 208, the cluster model is trained with the category vectors. In one or more embodiments, the cluster model is trained using a k-means clustering algorithm with a maximum number of clusters set to about 40. In one or more embodiments, the clustering algorithm generates a set of random vectors within the domain of the category vectors to act as the initial centroids for the clusters, the category vectors are individually assigned to the cluster with the nearest centroid, the centroids of the clusters are recalculated based on the assignment of the category vectors to the clusters. The clustering algorithm may continue to repeat until the updates to the centroid have stopped or are below a threshold amount (e.g., below a change of about 1% to the values of the centroids).

Turning to FIG. 2B, the process (220) uses a machine learning model to generate suggestions from invoices. In one or more embodiments, the machine learning model may include a trained neural network model and a cluster model.

In Step 222, an invoice is obtained. In one or more embodiments, the invoice includes an invoice string of characters. In one or more embodiments, the invoice is one of multiple invoices for the business using the system to generate recommendations for products.

In Step 224, category vectors are generated with the neural network model. In one or more embodiments, the neural network model may be the same as the model that was previously trained (including the embedding layer, the neural network layer, and the dense layer) but without the activation layer. In one or more embodiments, the invoice string from the invoice is input to the neural network model. The embedding layer of the neural network model generates word vectors from the invoice string of the invoice. The neural network layer of the neural network model generates intermediate vectors from the word vectors. The dense layer of the neural network model generates a category vector for the invoice from the intermediate vectors. An example of the neural network being used is shown in FIG. 4.

In Step 226, suggestions are selected with category vectors and the cluster model. In one or more embodiments, a suggestion is selected in response to comparing the category vector generated from the invoice to the set of clusters from the cluster model. As an example, the category vector may be compared to the centroids of the clusters of the set of clusters to identify the cluster centroid that is nearest to the category vector and identify the cluster to which the category vector belongs.

After identifying the cluster of the category vector, a set of suggested category vectors that also belong to the cluster are identified. The set of suggested category vectors may include category vectors generated from invoices from different companies that were not used to train the neural network model, were not used to train the cluster model, and which may have been received after training the neural network model and the cluster model. The set of suggested category vectors may include a threshold number of suggested category vectors that have the shortest Euclidean distances to the category vector.

In one or more embodiments, after identifying the set of suggested category vectors, the invoice strings from which the suggested category vectors were generated are retrieved. The invoice string of the suggested category vector with the shortest Euclidean distance to the category vector may be identified as the suggestion.

In additional embodiments, suggested category vectors with invoice strings that use a threshold number of the same words as the invoice string of the invoice from which the category vector was generated are removed from the set of suggested category vectors. Suggestions from the invoice strings of the remaining suggested category vectors may identify products that are different from the products described by the invoice used to generate the category vector and which may not be offered by the business that created the invoice.

In additional embodiments, suggestions may be identified from invoices that relate to a business category that is different from the business category of the invoice from which the category vector was generated. Suggestions from different business categories may be identified using the activation layer. Activated vectors generated by the activation layer identify the business categories of the invoices from which the activated vectors were generated. The category vector, which was generated from the invoice, and the suggested category vectors are input to the activation layer to generate an activated vector for the category vector and a set of suggested activated vectors for the suggested category vectors. An activated vector identifies a business category of an invoice with the dimension of the activated vector that has the highest value. The suggested activated vectors that identify the same business category as the activated vector may be removed from the set of suggested activated vectors. A threshold number of invoice strings from which the remaining suggested activated vectors were generated are selected as the suggestions. The suggested activated vectors may be ordered by their Euclidean distance from the activated vector.

In Step 228, the suggestions are presented. In one or more embodiments, suggestions are presented by transmitting the suggestions from a server to a user device and by displaying the suggestions with a graphical user interface on the user device. The graphical user interface may be used to edit the words in the invoice string of the invoice. In response to adjusting the invoice, the suggestions may be adjusted so that different suggestions are displayed that correspond the adjustment to the invoice.

Figure 5:
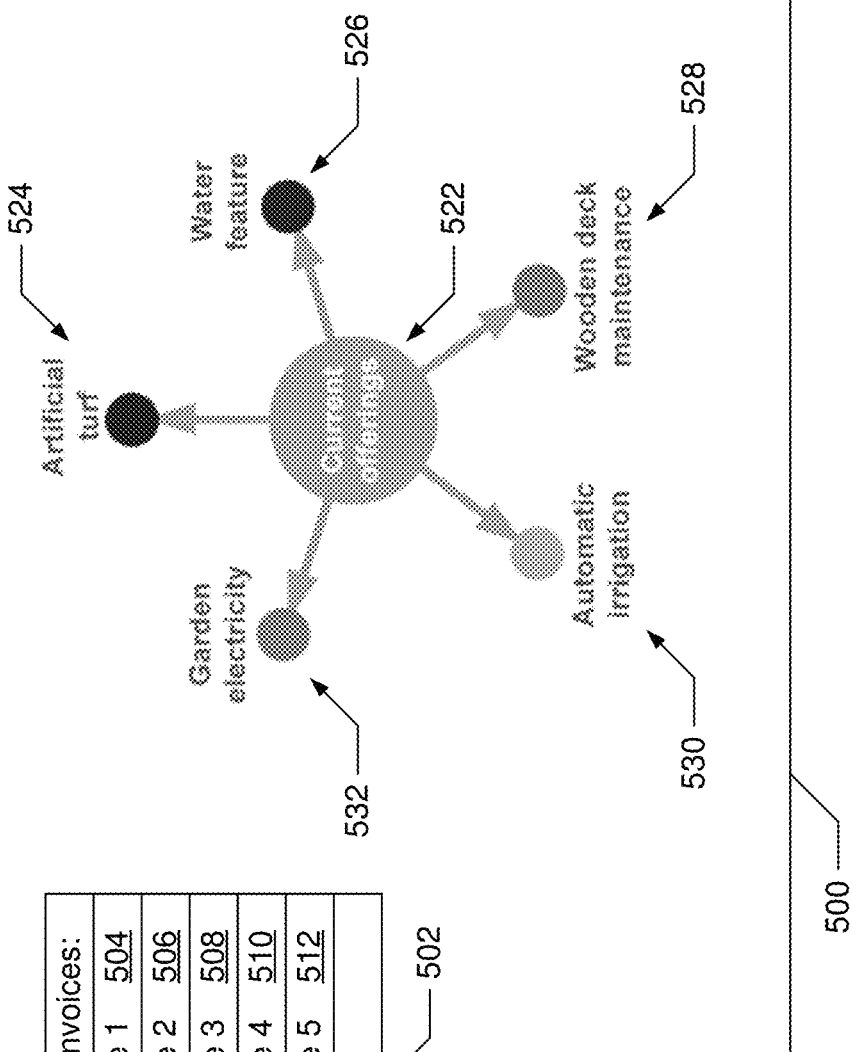

FIG. 3, FIG. 4, and FIG. 5 show examples of systems and interfaces that provide suggestions based on clusters and category vectors generated by machine learning models from invoices. The various elements, widgets, components, and interfaces shown in FIG. 3, FIG. 4, and FIG. 5 may be omitted, repeated, combined, and/or altered as shown. Accordingly, the scope of the present disclosure should not be considered limited to the specific arrangements shown in FIG. 3, FIG. 4, and FIG. 5.

Turning to FIG. 3, the training application (300) includes objects, data, and programs to train machine learning models for generating suggestions from invoices. The training invoices (302) include the training invoice (304). The training invoices (302) are historical invoices from a repository. The training invoices (302) are from multiple businesses for multiple products and business categories. The training invoices (302) are associated (i.e., labeled) with business categories that identify the type of business that generated the training invoices (302). The training invoice (304) is the basis from which the word vectors (314), the intermediate vectors (318), the category vector (222), and the activated vector (320) are generated. The training invoice (304) is input to the neural network model (310). As an example, the training invoices (302) may include the invoice text and associated business category labels listed below in Table 1.

TABLE 1

| Invoice Text | Business Category Label |
| --- | --- |
| bedroom install porta cool | Air Conditioning and Refrigeration Repair Shops |
| bedroom light dimmer | Electrical Contractors |
| breaker freon | Air Conditioning and Refrigeration Repair Shops |
| breaker tripped | Air Conditioning and Refrigeration Repair Shops |
| check water panel | Electrical Contractors |
| check wire shorting | Electrical Contractors |
| compressor change | Air Conditioning and Refrigeration Repair Shops |
| compressor sets United States | Miscellaneous Repair Shops and Related Services |
| deli freezer iced | Air Conditioning and Refrigeration Repair Shops |
| Electric Rough Trim | Electrical Contractors |
| Electric Trim | Electrical Contractors |
| freon low | Air Conditioning and Refrigeration Repair Shops |
| freon master | Air Conditioning and Refrigeration Repair Shops |

TABLE 1-continued

| Invoice Text | Business Category Label |
| --- | --- |
| frozen pipe | Miscellaneous Repair Shops and Related Services |
| fryer | Air Conditioning and Refrigeration Repair Shops |
| multiple repair | Miscellaneous Repair Shops and Related Services |
| red road intercom service | Electrical Contractors |
| refrigerator repair | Miscellaneous Repair Shops and Related Services |
| repair cord | Electrical Contractors |
| repair fan | Electrical Contractors |
| repair lights | Electrical Contractors |
| repair light | Electrical Contractors |
| repair light outlet | Electrical Contractors |
| repair outlet | Electrical Contractors |
| repair recane | Miscellaneous Repair Shops and Related Services |
| repair strip | Miscellaneous Repair Shops and Related Services |
| repair strobe light | Miscellaneous Repair Shops and Related Services |
| repair tag | Miscellaneous Repair Shops and Related Services |
| replace ballast Nancy's desk | Electrical Contractors |
| replace breaker | Electrical Contractors |
| replace broken fan | Electrical Contractors |
| replace light program mileage | Miscellaneous Repair Shops and Related Services |
| Starting Equip kitchen | Air Conditioning and Refrigeration Repair Shops |
| Stat Battery | Air Conditioning and Refrigeration Repair Shops |
| Stat Master | Air Conditioning and Refrigeration Repair Shops |
| State DIR Salinas VZWI SWAP TOTALLY | Miscellaneous Repair Shops and Related Services |
| State Line Propane case | Miscellaneous Repair Shops and Related Services |
| Sunset Mechanical Bakersfield | Miscellaneous Repair Shops and Related Services |
| Superior Alarm Systems Canoga Park SUPE TOTALLY | Miscellaneous Repair Shops and Related Services |
| Supply Vinita Case | Miscellaneous Repair Shops and Related Services |
| TennyBrook Mkt Reach freezer island cooler | Air Conditioning and Refrigeration Repair Shops |
| Terrace burned wire | Air Conditioning and Refrigeration Repair Shops |
| Terrace cooling | Air Conditioning and Refrigeration Repair Shops |
| Terran repair | Air Conditioning and Refrigeration Repair Shops |
| Total line temp stop Stat | Air Conditioning and Refrigeration Repair Shops |
| Trailer Cord Plug | Miscellaneous Repair Shops and Related Services |
| Trailer Installation | Electrical Contractors |
| trailer outlet | Electrical Contractors |
| TROUBLE SHOOT HEAT PUMP | Air Conditioning and Refrigeration Repair Shops |
| Trouble shoot light | Air Conditioning and Refrigeration Repair Shops |
| Trouble shoot line cooler | Air Conditioning and Refrigeration Repair Shops |
| Troubleshoot lidy re fan noise | Air Conditioning and Refrigeration Repair Shops |
| WABASH ALUMINUM DOOR HINGE HOLE | Miscellaneous Repair Shops and Related Services |
| WALK COOLER ICE MACHINE | Miscellaneous Repair Shops and Related Services |
| WALK FREEZER | Miscellaneous Repair Shops and Related Services |
| WALK FREEZER INSIDE | Miscellaneous Repair Shops and Related Services |
| WALK REFRIGERATOR WARM | Miscellaneous Repair Shops and Related Services |
| Wireless Subwoofer maintenance | Electrical Contractors |

The neural network model (310) may comprise several layers, including the embedding layer (312), the neural network layer (316), the dense layer (320) and the activation layer (324). The neural network model (310) may receive the training invoice (304) that includes an invoice string as an input and may output the category vector (322) and the activated vector (326). The invoice string may be limited to a threshold number of words (e.g., ten words) from the training invoice (304).

The embedding layer (312) takes the training invoice (304) as an input and outputs the word vectors (314). The word vectors (314) may include a threshold number of vectors that is equal to the number of words used from the invoice string of the training invoice. The word vectors may have a number of dimensions equal to the number of words (e.g., about 2500 words) in a vocabulary, which includes the words from the training invoices (302). The embedding layer (312) may be pre-trained with data that does not include the training invoices. The number of dimensions of the word vectors (314) may be produced from the number of different words from the original vocabulary used to train the embedding layer (312) down to the number of different words for the training invoices (302) (e.g., from 2500 words down to about 1000 words).

The neural network layer (316) generates the intermediate vectors (318) from the word vectors (314). In one or more embodiments, the dimensions of the intermediate vectors (318) is equal to the number of dimensions of the word vectors (314). The neural network layer (316) may include one or more recurrent neural network layers (RNNs), long short term memory (LSTM) layers, and convolutional neural network (CNN) layers.

The dense layer (320) generates the category vector (322) from the intermediate vectors (318). The category vector (322) may have a number of dimensions equal to the number of business categories used to label to the training invoices (302). The business categories identify the types of businesses that created the training invoices (302). In one or more embodiments, the system classifies the training invoices (302) into about 100 business categories. As an example, the business categories may include the categories listed below in Table 2 (which includes the three labels "Air Conditioning and Refrigeration Repair Shops", "Electrical Contractors", and "Miscellaneous Repair Shops and Related Services", from Table D.

TABLE 2

| Business Category |
| --- |
| Advertising Services |
| Air Conditioning and Refrigeration Repair Shops |
| Air Conditioning, Heating, and Plumbing Contractors |
| Automotive Parts, Accessories Stores |
| Automotive Service Shops |
| Cleaning and Maintenance, Janitorial Services |
| Commercial Photography, Art, and Graphics |
| Dentists, Orthodontists |
| Electrical Contractors |
| General Contractors/ Residential and Commercial |
| Legal Services, Attorneys |
| Medical and Dental Laboratories |
| Medical Services and Health Practitioners not elsewhere classified |
| Men's and Women's Clothing Stores |
| Miscellaneous and Specialty Retail Stores |
| Miscellaneous Publishing and Printing |
| Miscellaneous Repair Shops and Related Services |
| Motor Freight Carriers, Trucking - Local/ Long Distance, Moving and Storage Companies, Local Delivery Services |
| Recreation Services not elsewhere classified |

TABLE 2-continued

| Business Category |
| --- |
| Sporting Goods Stores |
| Swimming Pools - Sales and Service |

The activation layer (324) generates the activated vector (326) from the category vector (322). The activated vector (326) and the category vector (222) may have the same number of dimensions. In one or more embodiments, the activation layer (324) includes a squashing function to generate the activated vector (326). The dimension of the activated vector (326) with the highest value identifies the predicted business category for the training invoice (304).

The loss function (328) generates updates for the neural network layer (316) and the dense layer (320) from the activated vector (320) and the business category associated with the training invoice (304). The activated vector (320) is compared to the business category associated with the training invoice (304) to create updated weights that are proportional to the amount of error between the activated vector (320) and the business category of the training invoice (304).

The cluster engine (332) receives a set of category vectors that include the category vector (322). The cluster engine (332) generates the cluster model (334) from the set of category vectors with a threshold number of clusters (e.g., about 50 clusters). In additional embodiments, the cluster engine (332) may use activated vectors instead of category vectors to generate the cluster model (334). As an example, the clusters may include the clusters listed below in Table 3. The clusters may include multiple business categories, which may overlap between different clusters.

TABLE 3

| Cluster | Business Category |
| --- | --- |
| Car repairs | Automotive Parts, Accessories Stores |
|  | Automotive Service Shops |
|  | Miscellaneous Repair Shops and Related Services |
|  | Motor Freight Carriers, Trucking - Local/ Long Distance, Moving and Storage Companies, Local Delivery Services |
|  | Recreation Services not elsewhere classified |
| Electrical repairs | Air Conditioning and Refrigeration Repair Shops |
|  | Air Conditioning, Heating, and Plumbing Contractors |
|  | Electrical Contractors |
|  | General Contractors/ Residential and Commercial |
|  | Miscellaneous Repair Shops and Related Services |
| Embroidery | Advertising Services |
|  | Commercial Photography, Art, and Graphics |
|  | Miscellaneous and Specialty Retail Stores |
|  | Miscellaneous Publishing and Printing |
|  | Sporting Goods Stores |
| Professional services | Dentists, Orthodontists |
|  | Legal Services, Attorneys |
|  | Medical and Dental Laboratories |
|  | Medical Services and Health Practitioners not elsewhere classified |
|  | Men's and Women's Clothing Stores |
| Swimming pools | Air Conditioning, Heating, and Plumbing Contractors |
|  | Cleaning and Maintenance, Janitorial Services |
|  | Electrical Contractors |
|  | General Contractors/ Residential and Commercial |
|  | Swimming Pools - Sales and Service |

Turning to FIG. 4, the server application (400) includes objects, data, and programs that use machine learning models to generate suggestions for products that a business may offer. The server application (400) includes the neural network model (410), the cluster model (334), and the selection engine (440), which are used to generate the suggestion (448) from the invoice (404).

The invoices (402) are a collection of invoices of a business. The invoices (402) include the invoice (404), which may be the basis from which the suggestion (448) is generated. In additional embodiments, multiple suggestions may be generated from the invoice (404), multiple invoices may be used to generate the suggestion (448), and multiple invoices may be used to generate multiple suggestions.

The neural network model (410) includes multiple layers that were trained by a training application. For example, the neural network model (410) includes the embedding layer (312), the neural network layer (316), and the dense layer (320) that were trained by the training application (300) from FIG. 3. The neural network model (410) does not include the activation layer (324) from the neural network model (310) of FIG. 3.

The neural network model (410) generates the category vector (422) in response to the invoice (404). The embedding layer (312) generates the word vectors (414) from the invoice (404). The neural network layer (316) generates the intermediate vectors (418) from the word vectors (414). The dense layer (320) generates the category vector (422) from the intermediate vectors (418).

The cluster model (334) includes a threshold number of clusters of category vectors. In one or more embodiments, the cluster model (334) was previously trained by the training application (300) from FIG. 3 without the invoices (402) (which include the invoice 404).

The selection engine (440) generates the suggestion (448) from the category vector (422) and the cluster model (334). The suggestion (448) is selected by comparing the category vector (422) to the cluster centroids from the cluster model (334) to identify the cluster of the category vector (422). After identifying the cluster of the category vector (422), the category vector in the same cluster having the shortest Euclidean distance to the category vector (422) may be selected as a suggested category vector. The invoice string used to generate the suggested category vector is then used to form the text of the suggestion (448).

Turning to FIG. 5, the graphical user interface (500) is presented to and displayed by a computing system. In one or more embodiments, the graphical user interface (500) is interacted with by a user to select and edit invoices from which suggestions are generated. The graphical user interface (500) includes the user interface elements (502) through (532). As an example, a user representing a pool maintenance business may request suggestions for additional products to offer based upon invoices from the pool maintenance business.

The user interface element (502) is a list of invoices that may be used to generate the suggestions displayed with the user interface elements (524) through (532). The list includes the items (504) through (512) for the invoices labeled "Invoice 1", "Invoice 2", "Invoice 3", "Invoice 4", and "Invoice 5". The items (504), (506), and (512) are selected and form the basis for the suggestions displayed with the user interface elements (524) through (532).

In one or more embodiments, double-clicking an item from the list of invoices (e.g., the item (504)) brings up an invoice edit window. The invoice edit window may allow the user to edit the invoice string of the invoice that was selected. After editing an invoice, the suggestions displayed with the user interface elements (524) through (532) may be updated based on the change to the invoice string of the invoice.

For the selected invoices, category vectors are generated using a neural network model. The category vectors generated from the selected invoices may be averaged and the averaged category vector may be used to identify the suggestions.

The elements (524) through (532) display text generated from invoice strings from a set of invoices that do not include the invoices listed in element (502). The category vectors for the elements (524) through (532) are in the same cluster as the averaged category vector generated from the selected invoices of element (502) and have the shortest Euclidean distance to the averaged category vector.

The user interface element (522) is labeled "Current offerings" and represents the invoices selected from the user interface element (502). In one or more embodiments, the size of the user interface element (522) may be proportional to the number of invoices selected, being larger when more invoices are selected and smaller when fewer invoices are selected.

The user interface elements (524) through (532) are respectively labeled "Artificial turf", "Water feature", "Wooden deck maintenance", "Automatic irrigation", and "Garden electricity". In one or more embodiments, the labels for the user interface elements (524) through (532) were generated from invoice strings for invoices used to generate the cluster model.

Embodiments of the invention may be implemented on a computing system. Any combination of mobile, desktop, server, router, switch, embedded device, or other types of hardware may be used. For example, as shown in FIG. 6A, the computing system (600) may include one or more computer processors (602), non-persistent storage (604) (e.g., volatile memory, such as random access memory (RAM), cache memory), persistent storage (606) (e.g., a hard disk, an optical drive such as a compact disk (CD) drive or digital versatile disk (DVD) drive, a flash memory, etc.), a communication interface (612) (e.g., Bluetooth interface, infrared interface, network interface, optical interface, etc.), and numerous other elements and functionalities.

The computer processor(s) (602) may be an integrated circuit for processing instructions. For example, the computer processor(s) may be one or more cores or micro-cores of a processor. The computing system (600) may also include one or more input devices (610), such as a touchscreen, keyboard, mouse, microphone, touchpad, electronic pen, or any other type of input device.

The communication interface (612) may include an integrated circuit for connecting the computing system (600) to a network (not shown) (e.g., a local area network (LAN), a wide area network (WAN) such as the Internet, mobile network, or any other type of network) and/or to another device, such as another computing device.

Further, the computing system (600) may include one or more output devices (608), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (602), non-persistent storage (604), and persistent storage (606). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

The computing system (600) may also be a virtual machine. The virtual machine may be hosted on a physical computer system by a cloud services provider.

The computing system (600) in FIG. 6A may be connected to or be a part of a network. For example, as shown in FIG. 6B, the network (620) may include multiple nodes (e.g., node X (622), node Y (624)). Each node may correspond to a computing system, such as the computing system shown in FIG. 6A, or a group of nodes combined may correspond to the computing system shown in FIG. 6A. By way of an example, embodiments of the invention may be implemented on a node of a distributed system that is connected to other nodes. By way of another example, embodiments of the invention may be implemented on a distributed computing system having multiple nodes, where each portion of the invention may be located on a different node within the distributed computing system. Further, one or more elements of the aforementioned computing system (600) may be located at a remote location and connected to the other elements over a network.

Although not shown in FIG. 6B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (622), node Y (624)) in the network (620) may be configured to provide services for a client device (626). For example, the nodes may be part of a cloud computing system. The nodes may include functionality to receive requests from the client device (626) and transmit responses to the client device (626). The client device (626) may be a computing system, such as the computing system shown in FIG. 6A. Further, the client device (626) may include and/or perform all or a portion of one or more embodiments of the invention.

The computing system or group of computing systems described in FIGS. 6A and 6B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the invention. The processes may be part of the same or different application and may execute on the same or different computing system.

Rather than or in addition to sharing data between processes, the computing system performing one or more embodiments of the invention may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the invention, may extract one or more data items from the obtained data. For example, the extraction may be performed as follows by the computing system in FIG. 6A. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail-such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system of FIG. 6A, while performing one or more embodiments of the invention, may perform data comparison. Data comparison may be used to compare two or more data values (e.g., A, B). For example, one or more embodiments may determine whether A>B, A=B, A !=B, A<B, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if A>B, B may be subtracted from A (i.e., A−B), and the status flags may be read to determine if the result is positive (i.e., if A>B, then A−B>0). In one or more embodiments, B may be considered a threshold, and A is deemed to satisfy the threshold if A=B or if A>B, as determined using the ALU. In one or more embodiments of the invention, A and B may be vectors, and comparing A with B requires comparing the first element of vector A with the first element of vector B, the second element of vector A with the second element of vector B, etc. In one or more embodiments, if A and B are strings, the binary values of the strings may be compared.

The computing system in FIG. 6A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 6A may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions present only a few examples of functions performed by the computing system of FIG. 6A and the nodes and/or client device in FIG. 6B. Other functions may be performed using one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method comprising:
   obtaining an invoice;
   generating a category vector from an invoice string of the invoice with a dense layer of a machine learning model, the machine learning model including an embedding layer, a neural network layer, and the dense layer;
   selecting, with a selection engine, a suggestion in response to comparing the category vector to a set of clusters, wherein the set of clusters are generated from a set of category vectors generated from the machine learning model; and
   presenting the suggestion, wherein the suggestion identifies a product that is different from an invoice product described by the invoice.

2. The method of claim 1, further comprising:
   generating the set of clusters using the set of category vectors generated by the dense layer of the machine learning model from a set of training invoices.

3. The method of claim 1, further comprising:
   generating a word vector from the invoice with the embedding layer;
   generating an intermediate vector from the word vector with the neural network layer; and
   generating the category vector from the intermediate vector with the dense layer.

4. The method of claim 1, further comprising:
   selecting the suggestion when the category vector is in a same cluster of the set of clusters as a suggested category vector of the suggestion.

5. The method of claim 1, further comprising:
   selecting the suggestion when a first activated vector generated from the category vector is different from a second activated vector generated from a suggested category vector of the suggestion.

6. The method of claim 1, wherein the product is not offered by a business that created the invoice.

7. The method of claim 1, further comprising:
   generating a set of category vectors that include the category vector from a set of invoices that include the invoice;
   selecting a set of suggestions that include the suggestion in response to comparing the set of category vectors to the set of clusters; and
   presenting the set of suggestions.

8. The method of claim 1, further comprising:
   adjusting the suggestion in response to adjusting the invoice.

9. A system comprising:
   a processor;
   a memory coupled to the processor;
   the memory comprising an application, wherein the application executes on the processor, uses the memory, and is configured for:
   obtaining an invoice;
   generating a category vector from an invoice string of the invoice with a dense layer of a machine learning model that includes an embedding layer, a neural network layer, and the dense layer;
   selecting, with a selection engine, a suggestion in response to comparing the category vector to a set of clusters, wherein the set of clusters are generated from a set of category vectors generated from the machine learning model; and
   presenting the suggestion, wherein the suggestion identifies a product that is different from an invoice product described by the invoice.

10. The system of claim 9, wherein the application is further configured for:
    generating the set of clusters using the set of category vectors generated by the dense layer of the machine learning model from a set of training invoices.

11. The system of claim 9, wherein the application is further configured for:
    generating a word vector from the invoice with the embedding layer;
    generating an intermediate vector from the word vector with the neural network layer; and
    generating the category vector from the intermediate vector with the dense layer.

12. The system of claim 9, wherein the application is further configured for:
    selecting the suggestion when the category vector is in a same cluster of the set of clusters as a suggested category vector of the suggestion.

13. The system of claim 9, wherein the application is further configured for:
    selecting the suggestion when a first activated vector generated from the category vector is different from a second activated vector generated from a suggested category vector of the suggestion.

14. The system of claim 9, wherein the product is not offered by a business that created the invoice.

15. The system of claim 9, wherein the application is further configured for:
    generating a set of category vectors that include the category vector from a set of invoices that include the invoice;
    selecting a set of suggestions that include the suggestion in response to comparing the set of category vectors to the set of clusters; and
    presenting the set of suggestions.

16. The system of claim 9, wherein the application is further configured for:
    adjusting the suggestion in response to adjusting the invoice.

17. A system comprising:
    a processor;
    a memory coupled to the processor;
    the memory comprising an application, wherein the application executes on the processor, uses the memory, and is configured for:

obtaining a set of training invoices;

training, using a training application and the set of training invoices, a neural network layer and a dense layer of a machine learning model that includes an embedding layer, the neural network layer, the dense layer, and an activation layer;

generating, using the dense layer, a set of category vectors from the set of training invoices; and training, with a cluster engine, a set of clusters of a cluster model using the set of category vectors generated from the machine learning model.

18. The system of claim 17, wherein the application is further configured for:

selecting a training invoice from the set of training invoices;

generating a word vector from the training invoice with the embedding layer;

generating an intermediate vector from the word vector with the neural network layer;

generating a category vector from the intermediate vector with the dense layer; and generating an activated vector from the category vector with the activation layer.

19. The system of claim 17, wherein the application is further configured for:

updating dense layer weights of the dense layer and neural network layer weights of the neural network layer using the activated vector.

20. The system of claim 17, wherein the application is further configured for:

generating the set of category vectors after training the machine learning model.

* * * * *